Patented Sept. 3, 1935

2,012,994

UNITED STATES PATENT OFFICE 2,012,994

AZO DYESTUFF AND ITS PRODUCTION

Norman Hulton Haddock, Prestwich Park North, Prestwich, and Clifford Paine, Handforth, England, assignors to Imperial Chemical Industries Limited, a corporation of Great Britain No Drawing. Application April 6, 1932, Serial No. 603,682. In Great Britain April 29, 1931

25 Claims. (Cl. 8—5)

The present invention relates to organic compounds and more particularly refers to the manufacture of azo dyestuffs, and the products resulting therefrom.

The object of this invention is to produce a new azo dyestuff which may be made insoluble by treatment on the fibre with dilute mineral acids. Further objects are to produce azo dyestuffs which are fast to washing, to produce azo dyestuffs having substituted in the end component the carboxyl group, to produce azo dyestuffs in which the carboxyl group may be eliminated by treatment with dilute mineral acids, and to produce azo dyestuffs whose solubility depend upon the presence of the carboxyl group in the end component and which are made insoluble by the elimination of this carboxyl group. Additional objects will appear hereinafter.

These objects are attained according to the present invention wherein aromatic mono- and di-amino compounds, which may contain one or more azo groups, are diazotized and coupled with an ortho-amino-aryl-thioglycollic acid possessing a free coupling position. The product resulting therefrom may be applied to the fibre and treated thereon with a dilute mineral acid.

The invention may be more fully understood by a consideration of the following examples. It is to be understood that these examples are intended merely to illustrate the specific methods by means of which the products of the present invention may be obtained and are not to be construed as limiting the spirit and scope of the invention.

Example I

Ten and seven-tenths (10.7) parts of o-toluidine were diazotized in the usual way. The solution of diazo compound thus produced was added slowly to an ice-cold solution of 25.5 parts of the sodium salt of 1-amino-2-naphthyl-thioglycollic acid and 16 parts of anhydrous sodium carbonate in 520 parts of water. Coupling was completed within a few hours. The dyestuff was separated by the addition of salt, followed by filtration. The new dyestuff was soluble in water and dyed wool a yellowish-orange shade from a dilute acetic acid bath. When the dyed wool was warmed in dilute mineral acid the shade became yellower and the dyeing much faster.

Example II

Eighteen and four-tenths (18.4) parts of benzidine were tetrazotized in the customary manner. The resulting tetrazo-solution was gradually added to an ice-cold solution of 51 parts of the sodium salt of 1-amino-2-naphthyl-thioglycollic acid and 28 parts of sodium acetate crystals in 300 parts of water. After 2 hours the reaction mixture was made neutral to litmus by the addition of aqueous sodium carbonate, the temperature was raised to 25° C. and the mixture was stirred for a further 20 hours to complete the reaction. The new dyestuff was then isolated by the addition of salt, followed by filtration. The product was water soluble, dyed cotton bluish-red shades from an alkaline bath, and was converted on the fibre, to an insoluble, yellowish-red lactam by warming the dyed cotton to 70° C. in ¼% hydrochloric acid, followed by rinsing in dilute alkali and finally rinsing in water.

Example III

Twenty-one and six-tenths (21.6) parts of 4:4'-diamino-diphenyl-sulfide were tetrazotized in the customary manner. The resulting tetrazo solution was gradually added to an ice-cold solution of 25.5 parts of the sodium salt of 1-amino-2-naphthyl-thioglycollic acid and 28 parts of sodium acetate crystals in 300 parts of water. After stirring for two hours a solution of 31.5 parts of 2-phenylamino-3-naphthol-6-sulfonic acid and 30 parts of anhydrous sodium carbonate in 250 parts of water was added to the reaction mixture, giving finally an alkaline reaction to brilliant yellow paper. After stirring for one more hour the combination was heated to 80° C. and isolated by the addition of a little common salt, followed by filtration. The new dyestuff dyed cotton in bluish-brown shades from an alkaline bath. By warming the dyed material in dilute mineral acids, followed by rinsing in dilute sodium carbonate, the dyeing became yellow-brown in shade and faster to washing.

Example IV

One hundred fifty (150) parts of p-aminoacetanilide were diazotized and the resulting diazo solution was made neutral to Congo red paper by the addition of sodium acetate crystals. A solution of 23.5 parts of the sodium salt of 1-naphthylamine-7-sulfonic acid in 300 parts of water was gradually added during one hour. After stirring for 12 hours the mono-azo compound was filtered off, dissolved in 300 parts of 10% sodium hydroxide and boiled under reflux for 2 hours. The hydrolyzed product was precipitated by the addition of 310 parts of 10% hydrochloric acid, filtered, and finally re-dissolved in 500 parts of water and 10.6 parts of anhydrous sodium carbonate. The solution was then tetrazotized by the addition of 70 parts of 20% aqueous sodium nitrite, followed by 50 parts of hydrochloric acid (sp. gr. 1.16). Tetrazotization was allowed to continue for 3 hours at 150° and the resulting suspension was slowly passed into a solution of 51 parts of the sodium salt of 1-amino-2-naphthyl-thioglycollic acid and 35 parts of sodium acetate crystals in 400 parts of water. Combination was substantially completed in 2 hours and the coupling solution was then made alkaline to brilliant yellow paper by the addition of 50 parts of anhydrous sodium carbonate, common salt added and the precipitated new tris-azo dyestuff filtered off.

It dyed cotton from an alkaline bath in blue-grey to black shades and by warming the dyed material in dilute mineral acids, followed by rinsing in dilute sodium carbonate, it became faster to washing.

*Example V*

Nine and three-tenths (9.3) parts of aniline were diazotized in the customary manner and the resulting diazo solution was gradually added to an ice-cold solution of 15.9 parts of 1-amino-5-naphthol in 200 parts of water and 40 parts of 30% sodium hydroxide. The combination was rapid and after half an hour the mono-azo compound was isolated by the addition of common salt and filtered off. The precipitate was re-suspended in 1000 parts of water and dissolved by the addition of 13.3 parts of 30% sodium hydroxide. 35 parts of 20% aqueous sodium nitrite were then added, followed by 30 parts of hydrochloric acid (sp. gr. 1.16), the temperature being maintained at 10–15° C. for 6 hours. The resulting diazo-azo compound was passed gradually into a solution of 25.5 parts of the sodium salt of 1-amino-2-naphthyl-thioglycollic acid and 25 parts of water at a temperature of 0–5° C. After stirring for two more hours combination was substantially completed. The reaction mixture was made alkaline to brilliant yellow paper by the addition of sodium carbonate, heated to 80° C., the new-formed dyestuff precipitated by the addition of a little common salt and filtered off. It dyed cotton, from an alkaline bath in bluish-grey to black shades. By treating the dyeings with warm dilute mineral acids, followed by rinsing in dilute sodium carbonate, they were rendered faster to washing and somewhat redder in shade.

In the above examples, 1-amino-2-phenyl-thioglycollic acid may be substituted for 1-amino-2-naphthyl-thioglycollic acid with very satisfactory results. The ortho-amino-aryl-thioglycollic acid used in accordance with the present invention may have substituted thereon alkyl, halogen, methoxy, and similar groups. These groups must not occupy positions in which coupling will take place. Not only may amino compounds be diazotized and coupled with the ortho-amino-aryl-thioglycollic acid but diamino compounds may be tetrazotized and coupled with the same component.

The products produced by the process of the present invention may be represented by the following formulas in which A represents an arylamine; M stands for the middle coupling components, capable of rediazotizing; D represents tetrazotizable diamine; E represents the end component which is a single copulatory compound; "—" stands for diazotized and coupled with:

Monoazo "A—E"
Disazo "A—M—E"
Disazo "D⟨E E⟩"
Trisazo "A—M—M—E" and "E—A—M—E"

The products of the present invention may be applied to the production of fast colors on either animal or vegetable fibres (including derived fibres such as artificial silks from regenerated cellulose or from cellulose esters or ethers).

These products are easily applied to the fibres and after being applied thereto are rendered insoluble by treatment with a dilute mineral acid, resulting in a color which is exceedingly fast to washing. This is a very effective method of producing an insoluble dye on the fibre and for this reason is very valuable from a commercial standpoint.

Without any intention to limit this invention, the following theory is advanced to explain the observed properties of behavior of the new dyestuffs. To consider, for instance, the product of Example 1, when it is isolated in the form of its sodium salt it most probably corresponds to the following formula:

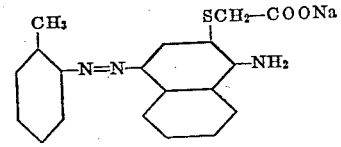

Because of the presence of the —COONa group, this compound is soluble in water, and may be readily applied to the fiber by merely steeping the latter in the aqueous solution. Upon treatment with a mineral acid, such as dilute hydrochloric acid, and warming, the compound apparently first becomes converted into the free acid, and then splits off water to form a thiazine ring. This process is known as lactamization, and the compound produced is a lactam. The formula of the dyestuff on the fiber most probably corresponds to the following:

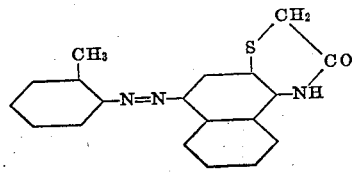

Since the lactam form is insoluble in water, the dyeing becomes fast to washing.

The lactam form, as well as the sodium or other salt of the dyestuff under discussion, may be considered as special forms of a compound which in the form of its hypothetical free acid may be represented by the formula

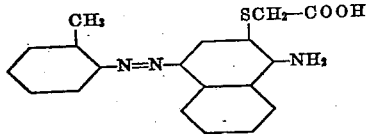

These forms are readily transformable into each other by the aid of acid or alkali as already indicated above. It shall be understood, therefore, that the expression "a compound which in the form of its hypothetical free acid has the formula (so and so)", in the claims below is intended to cover generically the free acid, the lactam form, as well as the alkali-metal salt forms.

As many apparently widely different embodiments of this invention may be made without departing from the spirit and scope thereof, it is to be understood that we do not limit ourselves to the specific embodiments thereof except as defined in the appended claims.

We claim:

1. A process for the manufacture of new azo compounds which comprises coupling a diazotized amino compound, which may contain more than one azo group, with an o-amino-aryl-thioglycollic acid having a free coupling position.

2. A process for the manufacture of new azo compounds which comprises coupling a diazotized amino compound, which may contain more than one azo group, with an o-amino-aryl-thioglycollic acid having a free coupling position, but not containing sulfonic acid or additional carboxyl groups.

3. A process for the manufacture of new azo compounds which comprises coupling a diazotized amino compound, which may contain more than one azo group, with 1-amino-2-phenyl-thioglycollic acid.

4. A process for the manufacture of new azo compounds which comprises coupling a diazotized amino compound, which may contain more than one azo group, with a 1-amino-2-phenyl-thioglycollic acid having a free coupling position, but not containing sulfonic acid or additional carboxyl groups.

5. A process for the manufacture of new azo compounds which comprises coupling a diazotized amino compound, which may contain more than one azo group, with 1-amino-2-naphthyl-thioglycollic acid.

6. A process for the manufacture of new azo compounds which comprises coupling a diazotized amino compound, which may contain more than one azo group, with a 1-amino-2-naphthyl-thioglycollic acid having a free coupling position, but not containing sulfonic acid or additional carboxyl groups.

7. A process for the manufacture of new azo compounds which comprises coupling a diazotized member selected from the group consisting of o-toluidine, benzidine, 4-4'-diamino-diphenyl-sulfide, 4-4'-diamino-7'-sulfonic acid-benzene-azo-naphthalene, and benzene-azo-4'-amino-8'-naphthol with 1-amino-2-naphthyl-thioglycollic acid.

8. A process for the manufacture of new azo compounds which comprises coupling diazotized o-toluidine with 1-amino-2-naphthyl-thioglycollic acid.

9. A process for the manufacture of new azo compounds which comprises coupling diazotized o-toluidine with a 1-amino-2-naphthyl-thioglycollic acid having a free coupling position, but not containing sulfonic acid or additional carboxyl groups.

10. Organic compounds containing at least one azo group and having as an end component the alkali-metal salt of an o-amino-aryl-thioglycollic acid.

11. Organic compounds containing at least one azo group and having as an end component the alkali-metal salt of 1-amino-2-phenyl-thioglycollic acid.

12. Organic compounds containing at least one azo group and having as an end component the alkali-metal salt of 1-amino-2-naphthyl-thioglycollic acid.

13. Azo compounds, adapted to be rendered insoluble by warming in dilute mineral acids, and having in the form of their hypothetical free acid the following general formula:

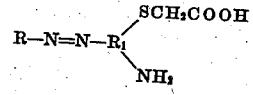

wherein R represents the residue of a diazotizable amine containing no water-solubilizing groups, and $R_1$ represents the aryl residue of an o-amino-aryl-thioglycollic acid.

14. Azo compounds, adapted to be rendered insoluble by warming in dilute mineral acids, and having in the form of their hypothetical free acid the following general formula:

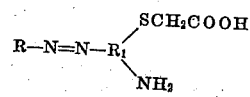

wherein R represents the residue of a diazotizable amine containing no water-solubilizing groups, and $R_1$ represents the aryl residue of a 1-amino-2-phenyl-thioglycollic acid.

15. Azo compounds, adapted to be rendered insoluble by warming in dilute mineral acids, and having in the form of their hypothetical free acids the following general formula:

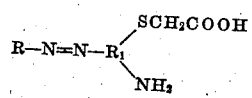

wherein R represents the residue of a diazotizable amine containing no water-solubilizing groups, and $R_1$ represents the aryl residue of a 1-amino-2-naphthyl-thioglycollic acid.

16. An azo compound having in the form of its hypothetical free acid the following formula:

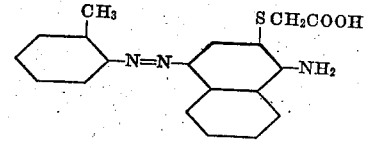

17. A dyestuff of the azo class adapted to dye animal and vegetable fiber, said dyestuff being water-soluble in substance but water-insoluble when dyed on the fiber, said dyestuff comprising in its structure a plurality of aryl nuclei joined together by at least one azo bridge and free from sulfo groups, said dyestuff being characterized by the presence in its structure of an ortho-amino-aryl-thioglycollate radical when in substance, and by the presence of a lactam radical of the general formula

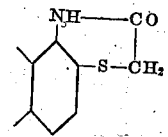

when on the fiber.

18. A dyestuff of the azo class adapted to dye animal and vegetable fiber, said dyestuff being water-soluble in substance but water-insoluble when dyed on the fiber, said dyestuff comprising in its structure a plurality of aryl nuclei joined together by at least one azo bridge and free from sulfo groups, said dyestuff being characterized by containing in its structure when in substance a 1-amino-naphthalene-2-alkali-metal-thioglycollate radical located at the end of the azo chain and being convertible when on the fiber into a lactam radical of the formula

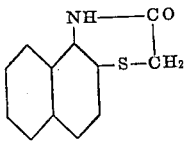

19. A dyestuff of the azo class adapted to dye animal and vegetable fiber, said dyestuff being water-soluble in substance but water-insoluble when dyed on the fiber, said dyestuff comprising in its structure a plurality of aryl nuclei joined together by at least one azo bridge and free from sulfo groups, said dyestuff being characterized by containing when in substance a 1-amino-naphthyl-2-thioglycollate residue on each end of the molecule and when on the fiber, after completion of the dyeing, a lactam radical of the formula

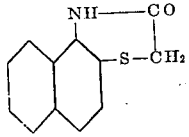

on each end of the molecule.

20. Textile material when dyed with the lactam form of a dyestuff as defined in claim 17.

21. Textile material when dyed with the lactam form of a dyestuff as defined in claim 18.

22. Textile material when dyed with the lactam form of a dyestuff as defined in claim 19.

23. A process for dyeing textile material which comprises applying thereto an aqueous solution of the salt form of a dyestuff as defined in claim 17, and then treating the fiber with a dilute solution of mineral acid whereby to convert the dyestuff on the fiber into a water-insoluble lactam form.

24. A process for dyeing textile material which comprises applying thereto an aqueous solution of the salt form of a dyestuff as defined in claim 18, and then treating the fiber with a dilute solution of mineral acid whereby to convert the dyestuff on the fiber into a water-insoluble lactam form.

25. A process for dyeing textile material which comprises applying thereto an aqueous solution of the salt form of a dyestuff as defined in claim 19, and then treating the fiber with a dilute solution of mineral acid whereby to convert the dyestuff on the fiber into a water-insoluble lactam form.

NORMAN HULTON HADDOCK.
CLIFFORD PAINE.